US012142843B2

(12) United States Patent
Wu et al.

(10) Patent No.: US 12,142,843 B2
(45) Date of Patent: Nov. 12, 2024

(54) ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Hau Yuen Tan, Taipei (TW); Chih-Wei Liao, Taipei (TW); Shih-Keng Huang, Taipei (TW); Wen-Hgin Chuang, Taipei (TW); Chia-Hong Chen, Taipei (TW); Lin-Hsu Chiang, Taipei (TW); Han-Wei Wang, Taipei (TW); Chun-Jung Hu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 154 days.

(21) Appl. No.: 18/173,555

(22) Filed: Feb. 23, 2023

(65) Prior Publication Data

US 2023/0402767 A1 Dec. 14, 2023

(30) Foreign Application Priority Data

Jun. 10, 2022 (TW) ................................. 111121703

(51) Int. Cl.
*H01Q 1/24* (2006.01)
*H01Q 1/52* (2006.01)
(Continued)

(52) U.S. Cl.
CPC ............. *H01Q 21/30* (2013.01); *H01Q 1/521* (2013.01); *H01Q 21/28* (2013.01)

(58) Field of Classification Search
CPC ............ H01Q 1/24; H01Q 1/243; H01Q 1/22; H01Q 1/48; H01Q 1/52; H01Q 1/521;
(Continued)

(56) References Cited

U.S. PATENT DOCUMENTS 8,854,267 B2 * 10/2014 Kim ........................ H01Q 7/00 343/702
9,190,713 B2 * 11/2015 Eom ..................... H01Q 1/243
(Continued)

FOREIGN PATENT DOCUMENTS

| | | |
|---|---|---|
| CN | 114069223 | 2/2022 |
| TW | I539666 | 6/2016 |
| TW | 202147688 | 12/2021 |

*Primary Examiner* — Tho G Phan
(74) *Attorney, Agent, or Firm* — J.C. PATENTS

(57) ABSTRACT

An electronic device, including a metal back cover, a ground radiator, a third radiator, and a metal frame including a first cutting opening, a second cutting opening, a first radiator located between the first cutting opening and the second cutting opening, and a second radiator located beside the second cutting opening and separated from the first radiator by the second cutting opening, is provided. An end of a first slot formed between the metal back cover and a first part of the first radiator is communicated with the first cutting opening, and a second slot formed between the metal back cover and a second part of the first radiator and between the metal back cover and the second radiator is communicated with the second cutting opening. The ground radiator connects the metal back cover and the first radiator and separates the first slot from the second slot.

10 Claims, 6 Drawing Sheets

(51) Int. Cl.
*H01Q 21/28* (2006.01)
*H01Q 21/30* (2006.01)

(58) Field of Classification Search
CPC .......... H01Q 21/28; H01Q 21/30; H01Q 5/30; H01Q 5/307; H01Q 5/37; H01Q 5/378; H01Q 9/42
See application file for complete search history.

(56) References Cited

U.S. PATENT DOCUMENTS

| | | | | |
|---|---|---|---|---|
| 9,647,320 | B2 * | 5/2017 | Lin | H01Q 21/00 |
| 10,700,409 | B2 * | 6/2020 | Huang | H01Q 1/2266 |
| 11,316,285 | B2 * | 4/2022 | Wu | H01Q 9/42 |
| 11,929,561 | B2 * | 3/2024 | Lee | H01Q 5/40 |

* cited by examiner

ELECTRONIC DEVICE

CROSS-REFERENCE TO RELATED APPLICATION

This application claims the priority benefit of Taiwan application serial no. 111121703, filed on Jun. 10, 2022. The entirety of the above-mentioned patent application is hereby incorporated by reference herein and made a part of this specification.

BACKGROUND

Technical Field

The disclosure relates to an electronic device, and particularly relates to an electronic device with an antenna structure.

Description of Related Art

Currently, due to high-texture requirements of the appearance, most electronic devices has the metal casings. However, how to design an antenna, especially to a broadband antenna, for the electronic devices having the metal casings, is a direction of research in this field.

SUMMARY

The disclosure provides an electronic device which has a metal casing and a broadband antenna.

An electronic device of the disclosure includes a metal back cover, a metal frame, a ground radiator, and a third radiator. The metal frame includes a first cutting opening, a second cutting opening, a first radiator located between the first cutting opening and the second cutting opening, and a second radiator located beside the second cutting opening. The first radiator and the second radiator are separated by the second cutting opening. A first slot is formed between the metal back cover and a first part of the first radiator, and a second slot is formed between the metal back cover and a second part of the first radiator and between the metal back cover and the second radiator. An end of the first slot is communicated with the first cutting opening, and the second slot is communicated with the second cutting opening. The second part of the first radiator is connected to the first part of the first radiator. The ground radiator connects the metal back cover and the first radiator and separates the first slot from the second slot. The third radiator is disposed adjacent to the second part of the first radiator, and a coupling gap is formed between the third radiator and the second part of the first radiator. The third radiator includes a feeding end that is adjacent to the second slot.

Under the condition of the electronic device with a metal appearance, the electronic device of the disclosure may utilize the metal frame including the first radiator and the second radiator, the third radiator, the ground radiator, a part of the metal back cover that is adjacent to the first radiator and the second radiator, the first slot, and the second slot to jointly form a broadband antenna structure. Therefore, the electronic device of the disclosure meets the requirements of high-texture appearance and multi-bands of frequencies.

DESCRIPTION OF THE EMBODIMENTS

Figure 1:
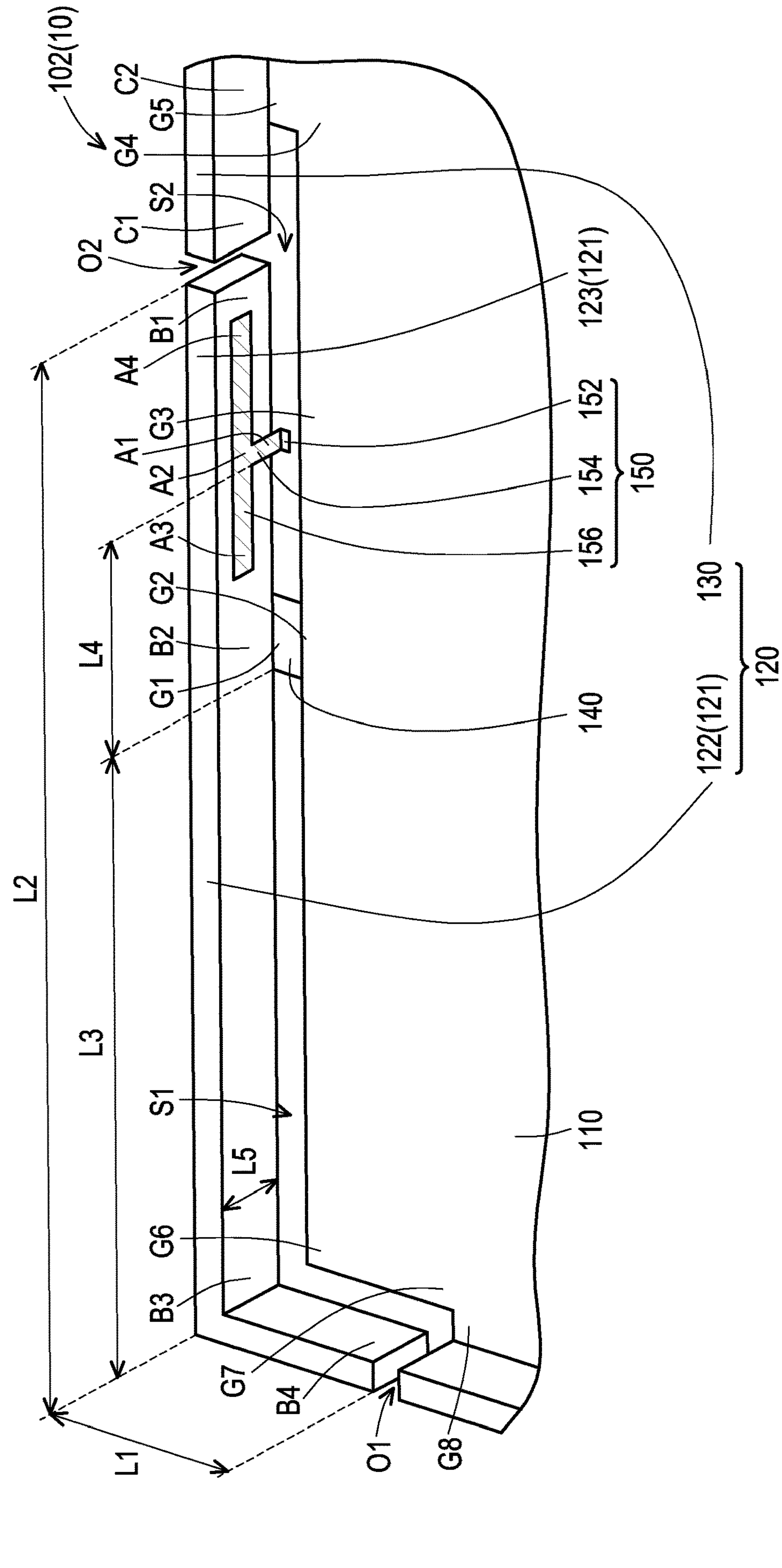
FIG. 1 is a schematic diagram of a first antenna structure of an electronic device according to an embodiment of the disclosure.

FIG. 1 is a schematic diagram of a first antenna structure of an electronic device according to an embodiment of the disclosure. It should be noted that, in order to clearly show a first antenna structure 102, internal components of an electronic device 10 are omitted in FIG. 1. Please refer to FIG. 1, the electronic device 10 in this embodiment takes a tablet computer as an example, but the types of the electronic device 10 are not limited thereto.

The electronic device 10 of this embodiment includes a metal back cover 110, a metal frame 120, a ground radiator 140 (an area of the path from a position G1 to a position G2), and a third radiator 150 (an area of the path from a position A1 to a position A2, from the position A2 to a position A3, and from the position A2 to a position A4). The metal frame 120 includes a first cutting opening O1, a second cutting opening O2, a first radiator 121 (an area of the path from a position B1 to a position B4) located between the first cutting opening O1 and the second cutting opening O2, and a second radiator 130 (an area of the path from a position C1 to a position C2) located beside the second cutting opening O2. The first radiator 121 and the second radiator 130 are separated by the second cutting opening O2.

It can be seen from FIG. 1 that in this embodiment, since the first radiator 121 may be located at a corner of the electronic device, the first radiator 121 is formed in an L shape. In other embodiments, the first radiator 121 may not be located at the corner and may be formed in an I shape or other shapes.

The ground radiator 140 connects the metal back cover 110 and the first radiator 121, and the first radiator 121 includes a first part 122 and a second part 123 connected to the first part 122. The first part 122 is located on a side (a left side in FIG. 1) of the ground radiator 140, and the second part 123 is located on the other side (a right side in FIG. 1) of the ground radiator 140. The ground radiator 140 separates a first slot S1 from a second slot S2, and a width of the ground radiator 140 in a longitudinal direction (i.e., from the left side to the right side in FIG. 1) is within a range of 5 mm to 10 mm.

Figure 2:
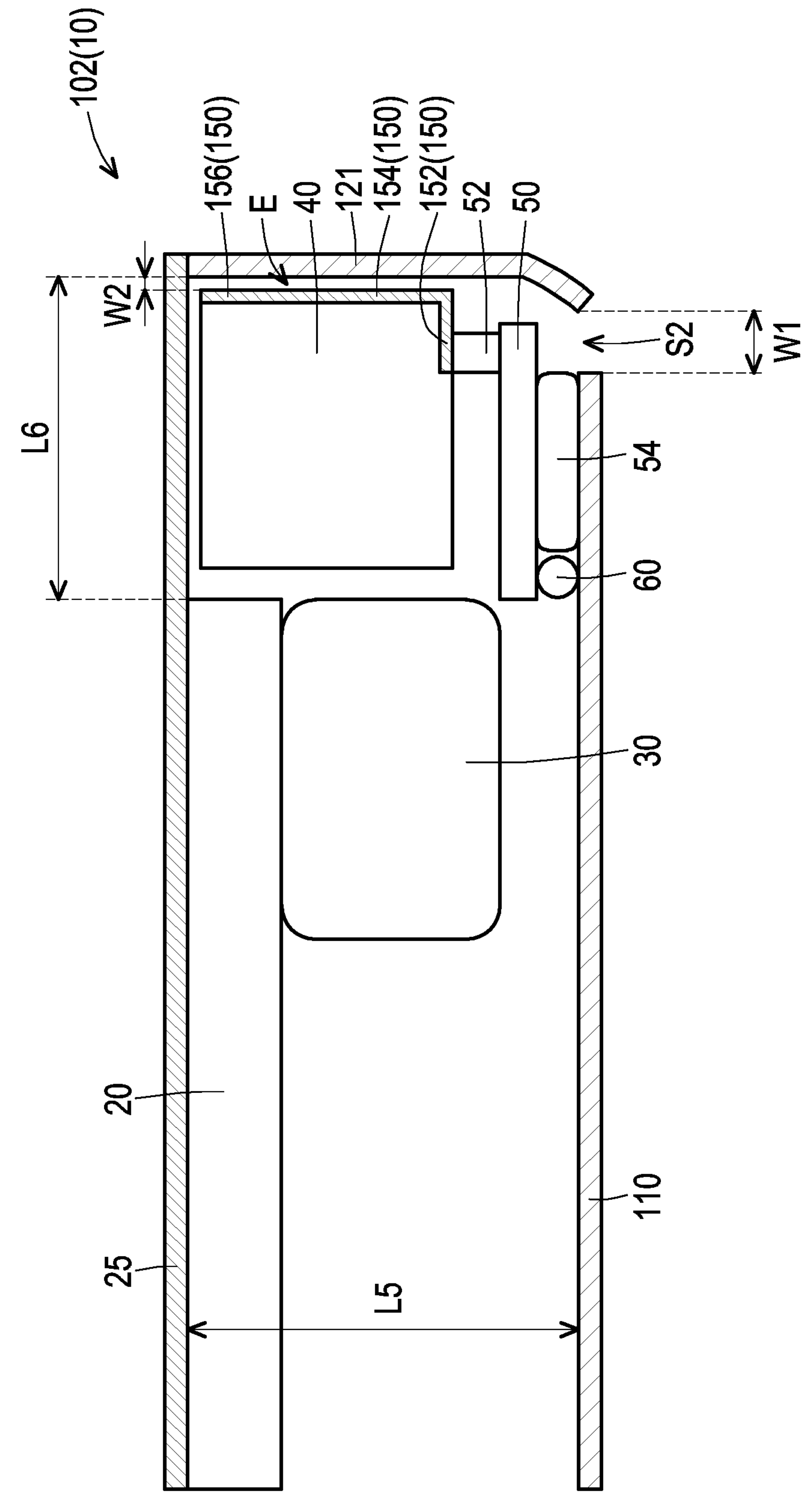
FIG. 2 is a schematic cross-sectional diagram of the electronic device in FIG. 1.

The first slot S1 is formed between the metal back cover 110 and the first part 122 of the first radiator 121, and an end of the first slot S1 is connected to the first cutting opening O1 (i.e., the first slot S1 is communicated with the first cutting opening O1). The second slot S2 is formed between the metal back cover 110 and the second part 123 of the first radiator 121 and between the metal back cover 110 and the second radiator 130, and the second slot S2 is connected to the second cutting opening O2 (i.e., the second slot S2 is communicated with the second cutting opening O2). In this embodiment, a width W1 (as shown in FIG. 2) of the first slot S1 and the second slot S2 is within a range of 1 mm to 3 mm. For example, a better coupling effect may be achieved as the width W1 of the first slot S1 and the second slot S2 is equal to 2 mm.

The third radiator 150 is disposed adjacent to the second part 123 of the first radiator 121, and a coupling gap E (as shown in FIG. 2) is formed between the third radiator 150 and the second part 123 of the first radiator 121. In this embodiment, a width W2 (as shown in FIG. 2) of the coupling gap E is within a range of 0.5 mm to 1.5 mm, for example, 1 mm. A good coupling effect may be achieved as the width W2 of the coupling gap E is within the above range.

The third radiator 150 includes a feeding end 152 that is adjacent to the second slot S2, and a first section 154 (an area of the path from the position A1 to the position A2) and a second section 156 (an area of the path from the position A3 to the position A4) which are formed in a T shape. The feeding end 152 is located at an end (a lower end) of the first section 154, and the other end (an upper end) of the first section 154 is connected to the second section 156.

The first radiator 121 of the metal frame, the second radiator 130 of the metal frame, the third radiator 150, the ground radiator 140, a part of the metal back cover 110 adjacent to the first radiator 121 and the second radiator 130 (i.e., an area of the path from position G2 to position G6 and from position G6 to position G8, and an area of the path from position G2 to position G5), the first slot S1, and the second slot S2 are jointly formed the first antenna structure 102 that has a broadband effect.

Specifically, the first antenna structure 102 feeds an antenna signal through the feeding end 152 of the third radiator 150, and the antenna signal goes upward along the first section 154 (the area of the path from the position A1 to the position A2) to connect to a left half of the second section 156 (the area of the path from the position A2 to the position A3) and a right half of the second section 156 (the area of path from the position A2 to the position A4) through the position A2. The third radiator 150 excites energy to the first radiator 121 (the area of the path from the position B1 to the position B4), the second radiator 130 (the area of the path from the position C1 to the position C2), and the ground radiator 140 (the area of the path from the position G1 to the position G2). The above radiators are combined with the first slot S1 and the second slot S2 to form the first antenna structure 102. As can be seen from FIG. 1, the first antenna structure 102 is a three-dimensional antenna structure with mutual coupling.

In this embodiment, the first antenna structure 102 may couple to form a first frequency band, a second frequency band, and a third frequency band. The first frequency band is within a range of 1565 MHz to 1710 MHz, the second frequency band is within a range of 1710 MHz to 2690 MHz, and the third frequency band is within a range of 3300 MHz to 5000 MHz. Therefore, the first antenna structure 102 is an ultra-wideband antenna.

The first part 122 of the first radiator 121, the ground radiator 140, and a part of the metal back cover 110 beside the first slot S1 (the area of the path from the position G2 to positions G6 and from position G6 to position G8) are jointly coupled to form the first frequency band. A path length of the first slot S1 (i.e., a sum of lengths L1 and L3) is 0.2 to 0.3 times a wavelength of the first frequency band. A resonant frequency of the first frequency band and a resonant frequency of the third frequency band (i.e., a double frequency of the first frequency band, such as a third resonance in FIG. 3) can be determined by the path length of the first slot S1. For example, the resonant frequency of the first frequency band and the resonant frequency of the third frequency band are 1800 MHz and 3600 MHz respectively.

In this embodiment, for the first radiator 121, the path length L1 (i.e., a path from the position B3 to position B4) is about 11.5 mm, a path length L2 (i.e., a path from the position B1 to position B3) is about 70 mm, and a path length L3 (i.e., a path from the position B2 to position B3) is about 43 mm. The first slot S1 is designed with the above lengths, so that a bandwidth of the first frequency band may cover an operating frequency band of GPS L1 1565 to 1710 MHz.

In addition, the second part 123 of the first radiator 121, the ground radiator 140, a part of the metal back cover 110 beside the second slot S2 (an area of the path from the position G2 to position G5), and the second radiator 130 are jointly coupled to form the second frequency band. A length of the second slot S2 is ¼ wavelength of the second frequency band. A resonant frequency of the second frequency band and a resonant frequency of the third frequency band (i.e., a fourth resonance in FIG. 3) can be determined by the length of the second slot S2.

In addition, in this embodiment, a distance L4 between a projection of the first section 154 on the second part 123 and the first part 122 is within a range of 12 mm to 18 mm, for example, 15 mm. The resonant frequency and an impedance matching bandwidth of the third frequency band (i.e., the fourth resonance in FIG. 3) may be adjusted by adjusting the lengths and the widths of the third radiator 150 (i.e., the path length passing through A1, A2 and A3) and adjusting the length (i.e., the path length passing through positions B1, B2, G1, G2, and G3). A resonant frequency and an impedance matching bandwidth of the second frequency band may be adjusted by adjusting the lengths and the widths of the third radiator 150 (i.e., the path length passing through A1, A2 and A4) and adjusting the length (i.e., the path length passing through the positions C1, C2, G5, G4, and G3).

FIG. 2 is a schematic cross-sectional diagram of the electronic device in FIG. 1. Please refer to FIG. 2. In the electronic device 10 of this embodiment, the third radiator 150 is disposed on a holder 40, and the third radiator 150 and the holder 40 are disposed together above the metal back cover 110 and are located at a frame area outside a screen 20. Since the width W2 (FIG. 2) of the coupling gap E is small, meaning that the third radiator 150 is far away from the screen 20, the influence of the screen 20 on the third radiator 150 is reduced.

A cover plate 25 covers the screen 20, the holder 40, and the third radiator 150. A distance L5 between the cover plate 25 and the metal back cover 110 is about 6.3 mm. A width L6 of the frame area is about 7.5 mm and is suitable for a space configuration of a narrow frame.

A coaxial transmission line 60 is soldered under an antenna circuit board 50. A distance between the antenna circuit board 50 and the metal back cover 110 is 1.6 mm, and a thickness of the antenna circuit board 50 is 0.85 mm. A speaker 30 may be disposed under the screen 20.

A positive end of the coaxial transmission line 60 is electrically connected to a signal end of a module card (not shown) of a motherboard (not shown), and is conducted to an upper surface of the antenna circuit board 50 through a conductive hole (not shown) of the antenna circuit board 50 and is connected to an elastic piece 52 via an RLC matching circuit (not shown) to feed a signal into the feeding end 152 of the third radiator 150. A ground surface of the antenna circuit board 50 is conducted to the metal back cover 110 through a conductive foam 54. The position G3 in FIG. 1 is a ground end of the antenna, and a negative end of the coaxial transmission line 60 is connected to the position G3 and is electrically connected to a ground end of the module card (not shown) of the motherboard (not shown).

The first antenna structure 102 of this embodiment may support GPS L1 (frequency 1565 to 1710 MHz) and 5G NR Sub-6G (medium high frequency 1710 to 2690 MHz and 3300 to 5000 MHz of ultrahigh frequency n77 to n79) under conditions that no switching circuit is added and the width L6 of the frame area (antenna free area) is smaller than 7.5 mm, so as to have broadband characteristics.

Figure 3:
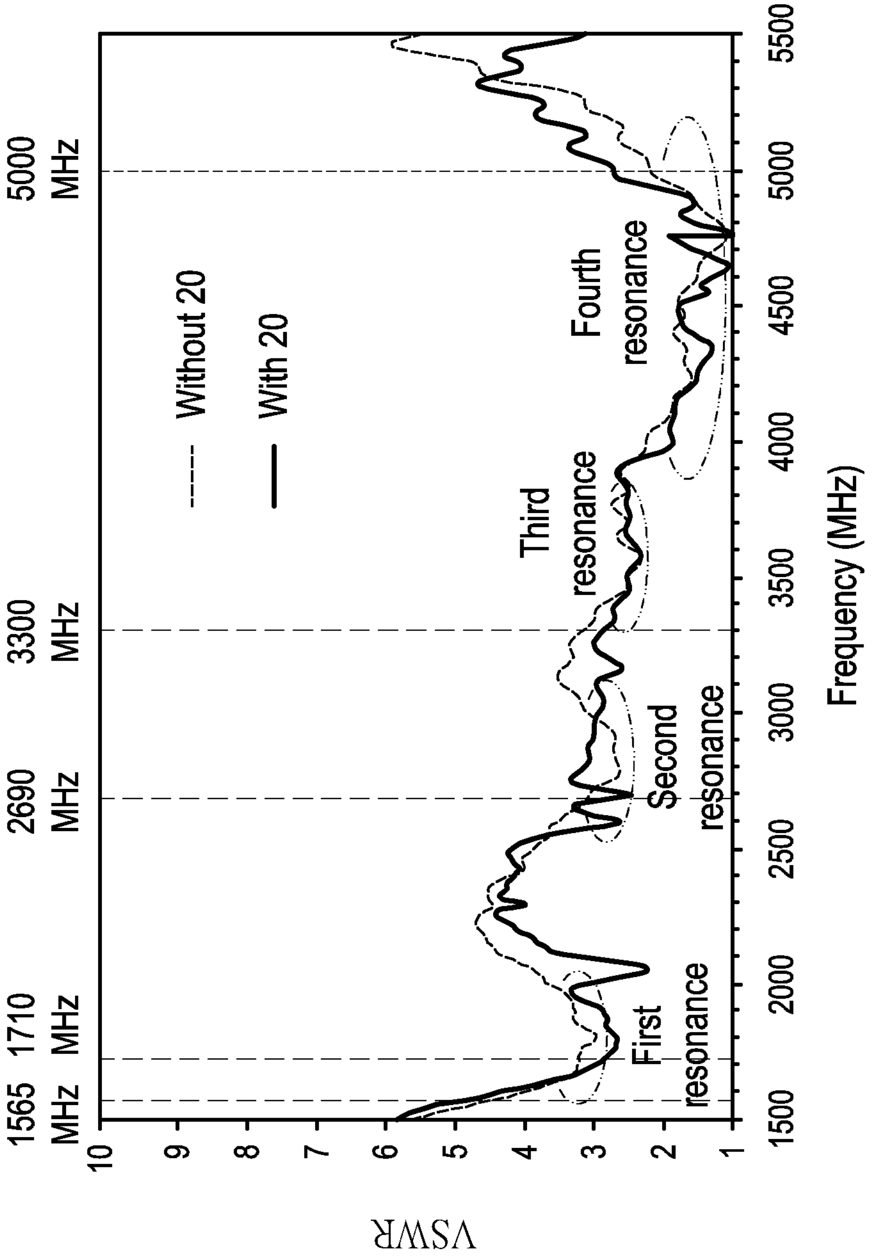
FIG. 3 is a frequency-VSWR (voltage standing wave ratio) relationship diagram of the first antenna structure in FIG. 1 with or without a screen.

FIG. 3 is a frequency-VSWR (voltage standing wave ratio) relationship diagram of the first antenna structure in FIG. 1 with or without a screen. Please refer to FIG. 3. In this embodiment, with or without the screen 20, VSWRs of the first antenna structure 102 may all be below 4.5 in the first frequency band (GPS L1 1565 to 1710 MHz), the second frequency band (medium high frequency 1710 to 2690 MHz), and the third frequency band (3300 to 5000 MHz of ultrahigh frequency n77 to n79), so as to have broadband and multi-band effects.

More specifically, a first resonance occurs at the first frequency band (GPS L1 1565 to 1710 MHz) and at the second frequency band (medium high frequency 1710 to 2690 MHz), a second resonance occurs at the second frequency band (medium high frequency 1710 to 2690 MHz) and 2690 to 3100 MHz, a third resonance occurs at the third frequency band (3300 to 5000 MHz of ultrahigh frequency n77 to n79), and a fourth resonance occurs at in the third frequency band (3300 to 5000 MHz of ultrahigh frequency n77 to n79). The VSWRs at the first, second, third, and fourth resonances may all be below 4.5.

Figure 4:
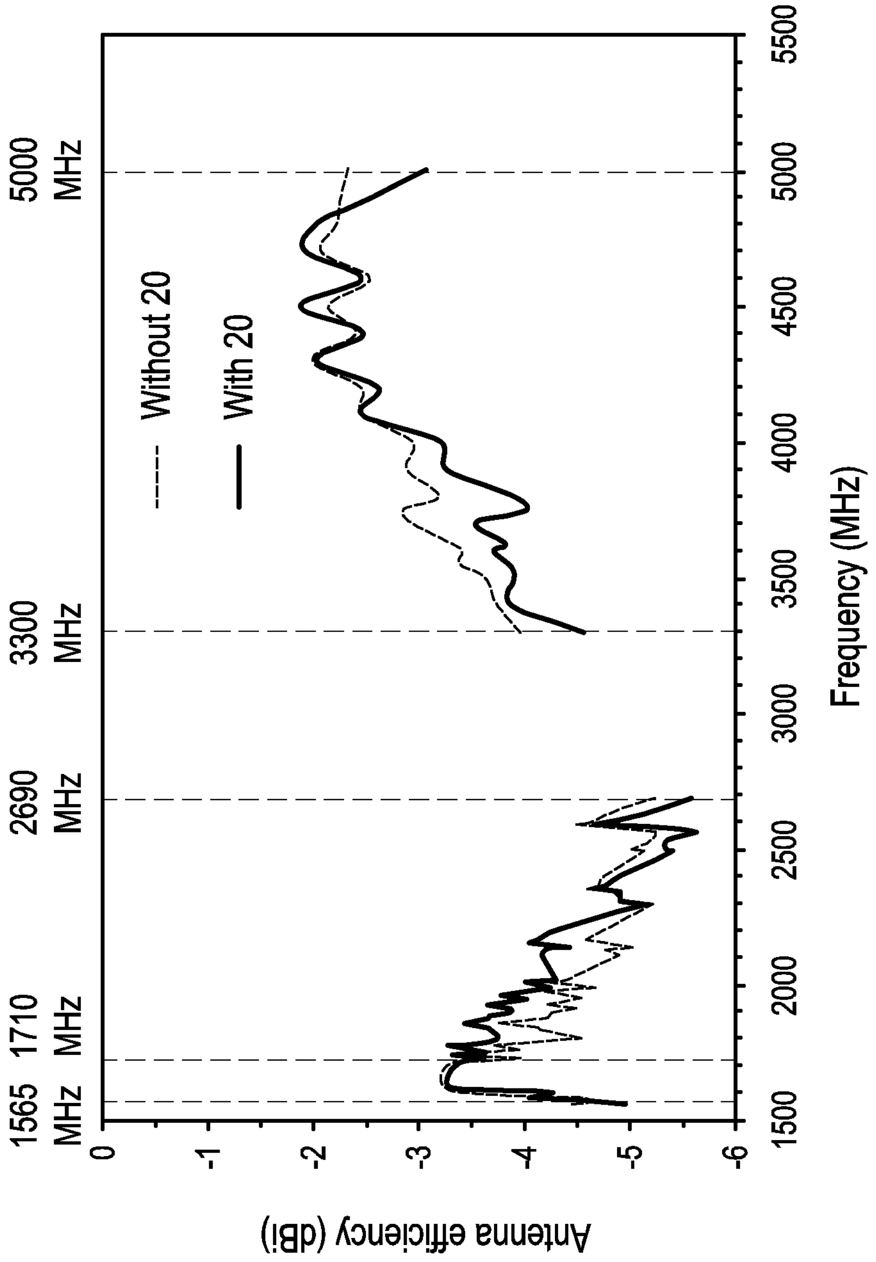
FIG. 4 is a frequency-antenna efficiency relationship diagram of the first antenna structure in FIG. 1 with or without a screen.

FIG. 4 is a frequency-antenna efficiency relationship diagram of the first antenna structure in FIG. 1 with or without a screen. Please refer to FIG. 4. In this embodiment, for the first antenna structure 102 with or without a screen, an antenna efficiency of the first frequency band (GPS L1 1565 to 1710 MHz) is −3.5 to −4.9 dBi, and an average of antenna efficiencies of the second frequency band (medium high frequency 1710 to 2690 MHz) and the third frequency band (3300 to 5000 MHz of ultrahigh frequency n77 to n79) is −4.5 dBi, so as to have a good performance.

In addition, there is little difference in the VSWR and the antenna efficiency of the first antenna structure 102 with or without the screen 20, so the first antenna structure has the advantage of not being affected by the metal of the screen 20.

In addition, a 3D radiation pattern test shows that a 3D radiation pattern of the first antenna structure 102 in this embodiment has omni-directional characteristics when a GPS frequency is 1575 MHz. That is to say, a GPS radiation pattern of the first antenna structure 102 has a good coverage and can have the advantage of half-hemisphere omni-directional radiation, which can achieve the effect of receiving GPS signals without dead angle.

Figure 5:
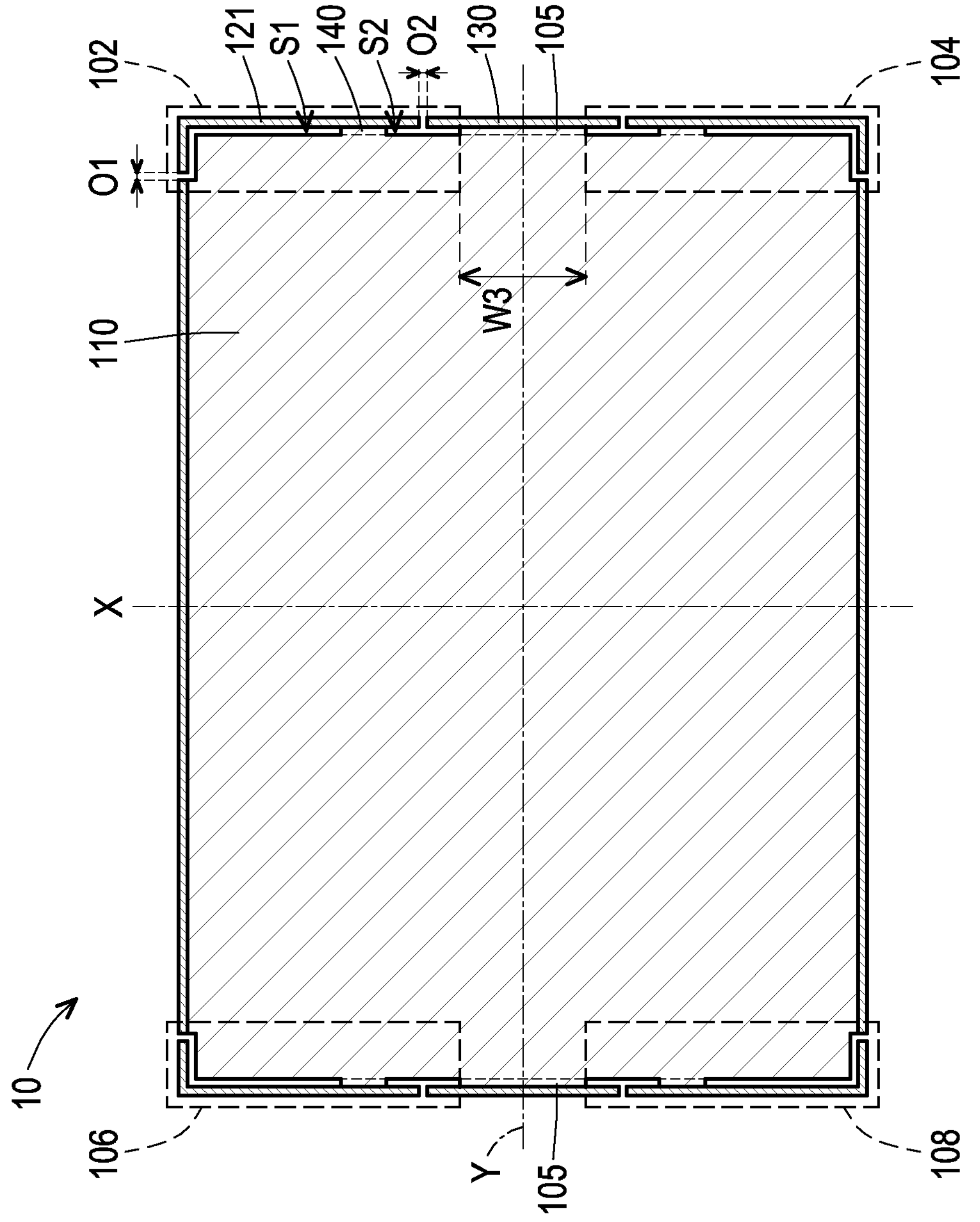
FIG. 5 is a schematic diagram of the positions of the four antenna structures of an electronic device.

FIG. 5 is a schematic diagram of the positions of four antenna structures of the electronic device in FIG. 1. Please refer to FIG. 5. In this embodiment, the electronic device 10 may also include a second antenna structure 104 that is identical to and configured mirroring the first antenna structure 102. The first antenna structure 102 and the second antenna structure 104 are located on one of the sides (the right side) of the metal frame. The first antenna structure 102 and the second antenna structure 104 are located at two corners (an upper right corner and a lower right corner) of the metal frame. A centerline Y passes through two centers of two opposite sides (two short sides) of the metal frame 120, and the first antenna structure 102 and the second antenna structure 104 are symmetrical in a relation to the centerline Y and are in an up-and-down mirrored form.

The metal back cover 110 also includes an isolator 105 located between the two second slots S2 of the two antenna structures. A width W3 of the isolator 105 is greater than or equal to mm to provide a good isolation effect between the two antennas.

In addition, in this embodiment, the electronic device 10 also includes a third antenna structure 106 and a fourth antenna structure 108 which are identical to and are configured mirroring the first antenna structure 102 and the second antenna structure 104. A centerline X passes through two centers of two opposite sides (two long sides) of the metal frame, and the first antenna structure 102, the second antenna structure 104, the third antenna structure 106, and the fourth antenna structure 108 are symmetrical in a relation to the centerline X.

Figure 6:
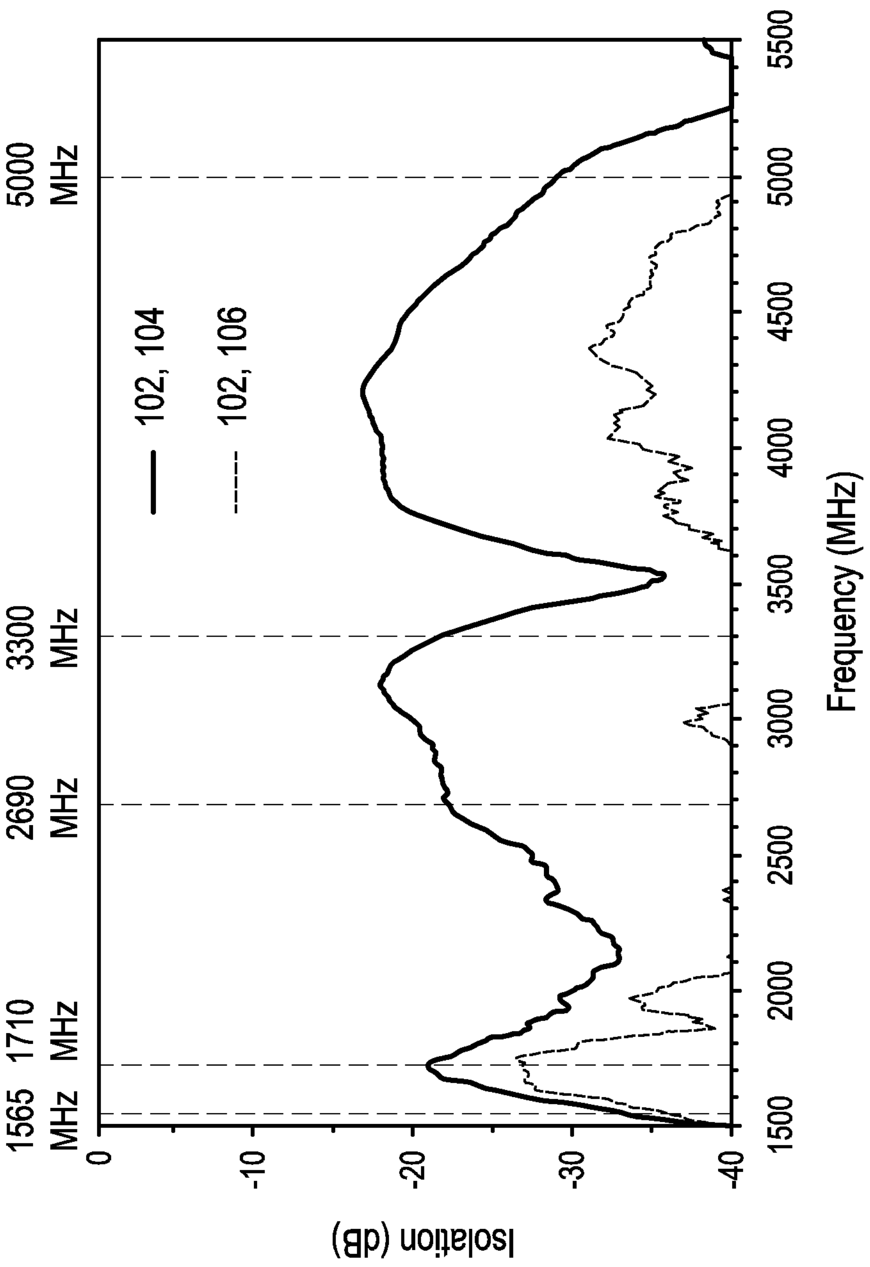
FIG. 6 is a frequency-isolation relationship diagram between the four antenna structures in FIG. 5.

FIG. 6 is a frequency-isolation relationship diagram between the four antenna structures in FIG. 5. Please refer to FIG. 6. An isolation between the first antenna structure 102 and the second antenna structure 104 of the electronic device 10 and an isolation between the first antenna structure 102 and the third antenna structure 106 are both at least 15 dB, so as to have a good performance.

In summary, the metal frame of the electronic device of the disclosure includes the first radiator located between the first cutting opening and the second cutting opening and the second radiator located beside the second cutting opening. The first radiator and the second radiator are separated by the second cutting opening. The first slot is formed between the metal back cover and the first part of the first radiator, and the second slot is formed between the metal back cover and the second part of the first radiator and between the metal back cover and the second radiator. The end of the first slot is communicated with the first cutting opening, and the second slot is communicated with the second cutting opening. The ground radiator connects the metal back cover and the first radiator and separates the first slot from the second slot. The third radiator is disposed adjacent to the second part of the first radiator and includes the feeding end that is adjacent to the second slot. The coupling gap is formed between the third radiator and the second part of the first radiator. Therefore, under the condition of maintaining a metal appearance, the electronic device of the disclosure may utilize the first radiator of the metal frame, the second radiator of the metal frame, the third radiator, the ground radiator, a part of the metal back cover that is adjacent to the first radiator and the second radiator, the first slot, and the second slot to jointly form a broadband antenna structure to meet the needs of aesthetics and multi-bands of frequencies.

What is claimed is:

1. An electronic device, comprising:

a metal back cover;

a metal frame, comprising a first cutting opening, a second cutting opening, a first radiator located between the first cutting opening and the second cutting opening, and a second radiator located beside the second cutting opening, wherein the first radiator and the second radiator are separated by the second cutting opening, a first slot is formed between the metal back cover and a first part of the first radiator, a second slot is formed between the metal back cover and a second part of the first radiator and between the metal back cover and the second radiator, an end of the first slot is communicated with the first cutting opening, the second slot is communicated with the second cutting opening, and the second part of the first radiator is connected to the first part of the first radiator;

a ground radiator, connecting the metal back cover and the first radiator and separating the first slot from the second slot; and a third radiator, being disposed adjacent to the second part of the first radiator, wherein a coupling gap is formed between the third radiator and the second part of the first radiator, and the third radiator comprises a feeding end that is adjacent to the second slot.

2. The electronic device according to claim 1, wherein a width of the coupling gap is 0.5 mm to 1.5 mm.

3. The electronic device according to claim 1, wherein the first part of the first radiator, the ground radiator, and a part of the metal back cover located beside the first slot jointly couple to form a first frequency band, and the first slot has a path length of 0.2 to 0.3 times a wavelength of the first frequency band.

4. The electronic device according to claim 1, wherein the second part of the first radiator, the ground radiator, a part of the metal back cover beside the second slot, and the second radiator jointly couple to form a second frequency band, and the second slot has a path length of ¼ wavelength of the second frequency band.

5. The electronic device according to claim 1, wherein a first frequency band, a second frequency band, and a third frequency band are formed, the first frequency band is within a range of 1565 MHz to 1710 MHz, the second frequency band is within a range of 1710 MHz to 2690 MHz, and the third frequency band is within a range of 3300 MHz to 5000 MHz.

6. The electronic device according to claim 1, wherein the third radiator comprises a first section and a second section which are formed in a T shape, the feeding end is located at an end of the first section, and other end of the first section is connected to the second section.

7. The electronic device according to claim 6, wherein a distance between a projection of the first section on the second part and the first part is 12 mm to 18 mm.

8. The electronic device according to claim 1, wherein a width of the ground radiator is within a range of 5 mm to 10 mm.

9. The electronic device according to claim 1, wherein the first radiator, the second radiator, the ground radiator, the third radiator, the first slot, the second slot, and a part of the metal back cover beside the first slot and the second slot are jointly formed a first antenna structure, the electronic device further comprises a second antenna structure identical to the first antenna structure, the first antenna structure and the second antenna structure are located on one side of the metal frame, the metal back cover further comprises an isolator located between the first and the second antenna structures, and a width of the isolator is greater than or equal to 25 mm.

10. The electronic device according to claim 1, wherein the first radiator, the second radiator, the ground radiator, the third radiator, the first slot, the second slot, and a part of the metal back cover beside the first slot and the second slot are jointly formed a first antenna structure, the electronic device further comprises a second antenna structure identical to the first antenna structure, the first antenna structure and the second antenna structure are located at two corners of the metal frame, a centerline passes through two centers of two opposite sides of the metal frame, and the first antenna structure and the second antenna structure are symmetrical in a relation to the centerline.

* * * * *